United States Patent
Nurmi

(10) Patent No.: US 7,570,959 B2
(45) Date of Patent: Aug. 4, 2009

(54) APPARATUS, METHOD AND COMPUTER PROGRAM PRODUCT PROVIDING LOCATION-ENHANCED CONTACT LIST

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 549 days.

(21) Appl. No.: 11/407,544

(22) Filed: Apr. 19, 2006

(65) Prior Publication Data

US 2007/0249327 A1    Oct. 25, 2007

(51) Int. Cl.
  *H04W 24/00* (2006.01)
(52) U.S. Cl. ............... 455/456.1; 455/456.6; 455/414.2
(58) Field of Classification Search ................ None
  See application file for complete search history.

(56) References Cited

U.S. PATENT DOCUMENTS 6,177,905 B1 *  1/2001  Welch ................... 342/357.13
2003/0224762 A1 * 12/2003  Lau et al. ................. 455/412.2
2004/0111360 A1 *  6/2004  Albanese ..................... 705/38
2004/0203847 A1  10/2004  Knauerhase et al. ...... 455/456.1
2006/0097866 A1 *  5/2006  Adamczyk et al. ..... 340/539.13
2006/0223518 A1 * 10/2006  Haney ........................ 455/420

FOREIGN PATENT DOCUMENTS

| EP | 1008946 A1 | 6/2000 |
| EP | 1361727 A2 | 11/2003 |
| WO | WO00-22860 | 4/2000 |
| WO | WO01-91485 A1 | 11/2001 |

* cited by examiner

*Primary Examiner*—Erika A Gary
(74) *Attorney, Agent, or Firm*—Harrington & Smith, PC

(57) ABSTRACT

A device includes an interface to a communications network; at least one data processor; at least one memory coupled to the at least one data processor, the at least one memory storing a contact list; and a user interface coupled to the at least one data processor. The data processor is responsive to a user specifying a place to determine if another device associated with a person in the contact list is present at the specified place and, if so, to contact the other device via the interface to the communications network.

31 Claims, 3 Drawing Sheets

US 7,570,959 B2

APPARATUS, METHOD AND COMPUTER PROGRAM PRODUCT PROVIDING LOCATION-ENHANCED CONTACT LIST

TECHNICAL FIELD

The teachings in accordance with the exemplary embodiments of this invention relate generally to communication devices and methods and, more specifically, relate to communication device contact list applications, such as wireless communication device contact list applications.

BACKGROUND

In certain telephones and telephone-like systems, such as in handheld wireless communication devices, as well as in certain computers such as personal computers and laptop computers, it is possible to store a list of telephone numbers in association with other information, such as a name of a person or an organization associated with each stored telephone number. By then scrolling through the list the user is enabled to select one number to be automatically dialed by a communication device to initiate a voice or a data call. While well suited for making a telephone call to an individual or an organization having a defined telephone number, this conventional approach has limitations.

SUMMARY OF THE EXEMPLARY EMBODIMENTS

The foregoing and other problems are overcome, and other advantages are realized, in accordance with the non-limiting and exemplary embodiments of this invention.

In accordance with the exemplary embodiments of this invention there is provided a method that includes, in a first mode of operation, specifying a place via a user interface of a device; determining if another device is at the specified place; and placing a call to the other device if the other device is determined to be at the specified place.

Further in accordance with the exemplary embodiments of this invention there is provided a computer program product that is embodied in at least one computer readable storage media and that comprises program instructions the execution of which by at least one data processor results in operations that include, in a first mode of operation, specifying a place via a user interface of a device; determining if another device is at the specified place; and placing a call to the other device if the other device is determined to be at the specified place.

Still further in accordance with the exemplary embodiments of this invention there is provided a device that comprises an interface to a communications network; at least one data processor; at least one memory coupled to the at least one data processor, the at least one memory storing a contact list; and a user interface coupled to the at least one data processor. The data processor is responsive to a user specifying a place to determine if another device associated with a person in the contact list is present at the specified place and, if so, to contact the other device via the interface to the communications network.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

By way of introduction, and to highlight the deficiencies in the operation of the conventional contact list mentioned above, a telephone user may face a situation where he or she would desire to place a call to a certain physical location or place, and does not care who answers the call. A telephone user may also desire to call a person only if the person is in a certain location. For example, assume that the telephone user has forgotten his keys to a summer cottage, and that there is no conventional landline telephone installed at the cottage (or the landline telephone is in use or otherwise not available). The user desires to call someone, actually anyone, that might currently be at the cottage, but doesn't know who may currently be there (if anyone). In a conventional approach the user may be required to call several people in an effort to determine who is currently at the cottage. The inventor has realized that it would be much more efficient for the user to make one call to a place (the cottage in this example) and not to any certain person, it being assumed that anyone who happened to be at the cottage could answer the call and locate the user's keys.

In accordance with the exemplary embodiments of this invention a communication device contact list application is enhanced to include software that is able to link location information to the contact list application. The enhancement enables the user of the communication device to make a call, not only to specific people, but also to a location or place.

Figure 1:
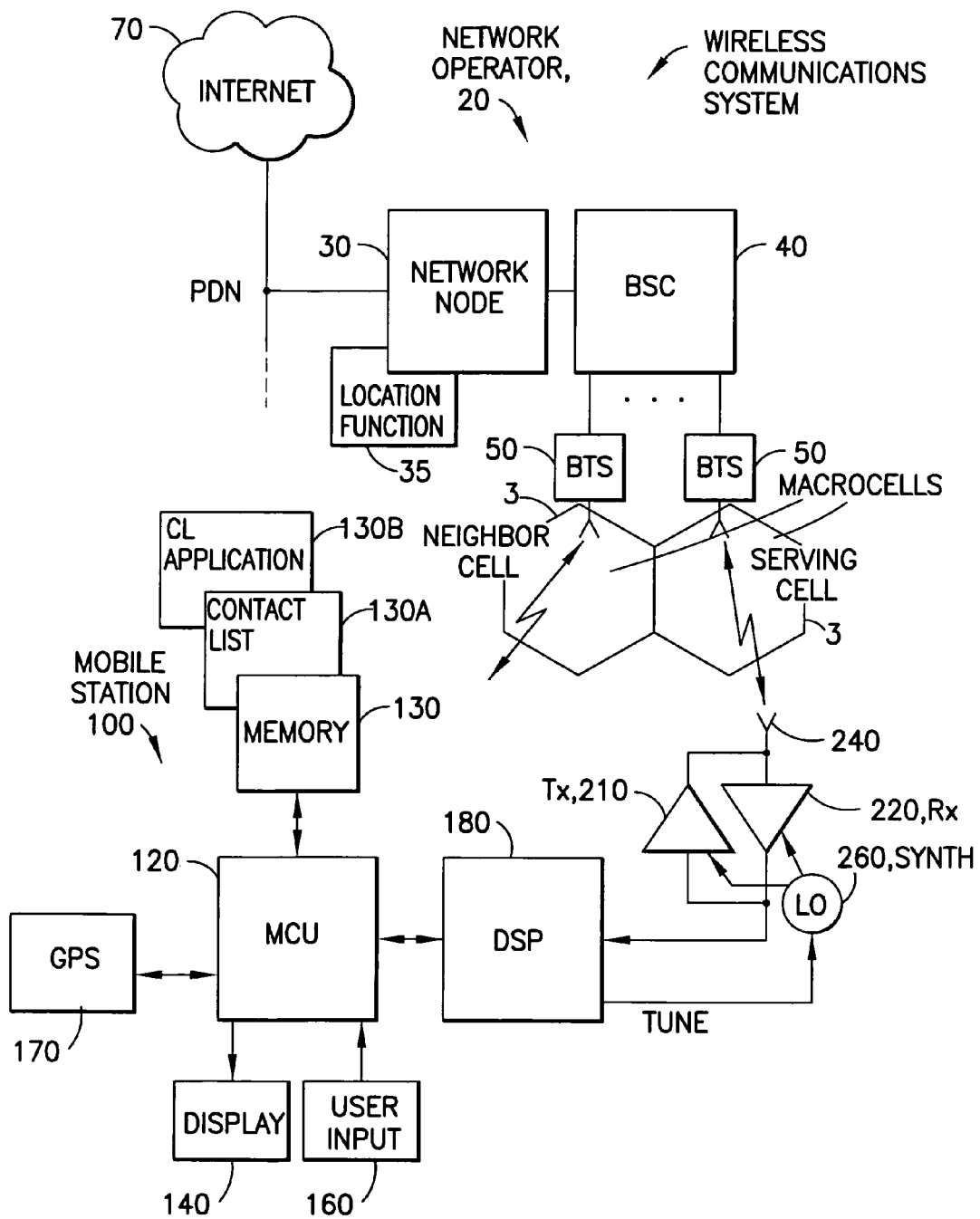
FIG. 1 is a simplified block diagram an embodiment of a wireless communications system having devices that are suitable for practicing the exemplary embodiments of this invention.

Referring to FIG. 1 there is shown as a simplified block diagram an embodiment of a wireless communications system 10 that is suitable for practicing the exemplary embodiments of this invention. The wireless communications system 10 includes at least one wireless communications device, such as a cellular telephone or more generally a mobile station (MS) 100. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. In a cellular type of system a cell 3 is associated with each BTS 50, where one cell will at any given time be considered to be a serving cell, while an adjacent cell(s) will be considered to be a neighbor cell. Smaller cells (e.g., picocells) may also be available.

In some types of systems MS 100 may be referred to as User Equipment (UE), and BS may be referred to as a Node-B.

The air interface standard can conform to any suitable standard or protocol, such as CDMA, WCDMA, and TDMAbased systems such as GSM, and may enable both voice and data traffic, such as data traffic enabling Internet 70 access and web page downloads.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer.

In general, the various embodiments of the MS 100 can include, but are not limited to, cellular telephones, personal digital assistants (PDAs) and portable computers, and may include or incorporate, as non-limiting examples, image capture devices such as digital cameras, gaming devices, music storage and playback appliances, Internet appliances permitting Internet access and browsing, as well as units or terminals that incorporate combinations of such functions.

It should be noted that the exemplary embodiments of this invention are not limited for use with wireless portable communication terminals, and can be practiced as well with communication devices that are connected by a wire or a cable (wired devices) to a telephone operator system, including those types of communication devices that employ voice over Internet (VoIP) technology. In general, it is assumed that the device will include or be coupled to some type of display for displaying at least a contact list to a user, as well as some type of user input to enable the user to enter information, as will be described in further detail below.

Still referring to FIG. 1, the MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. The operating program is assumed, for the purposes of this invention, to enable the MCU 120 to execute the software routines, layers and protocols required to implement the methods in accordance with this invention, as well as to provide a suitable user interface (UI) with a user via a display 140 and a user input 160. Although not shown, a microphone and speaker are typically provided for enabling the user to conduct voice calls in a conventional manner.

Stored in the memory 130 is assumed to be a location-enhanced contact list 130A that is established, managed and used in accordance with the exemplary embodiments of this invention. Associated with the contact list 130A is a contact list (CL) application 130B that comprises computer executable program code that is suitable for use in implementing the exemplary embodiments of this invention, as described more fully below.

The mobile station 100 may also include a location determination module, such as a GPS (Global Positioning Satellite) unit 170.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240. The wireless section may be considered to function as an interface to a communications network, such as the operator network 20 and or the Internet 70.

Figure 2:
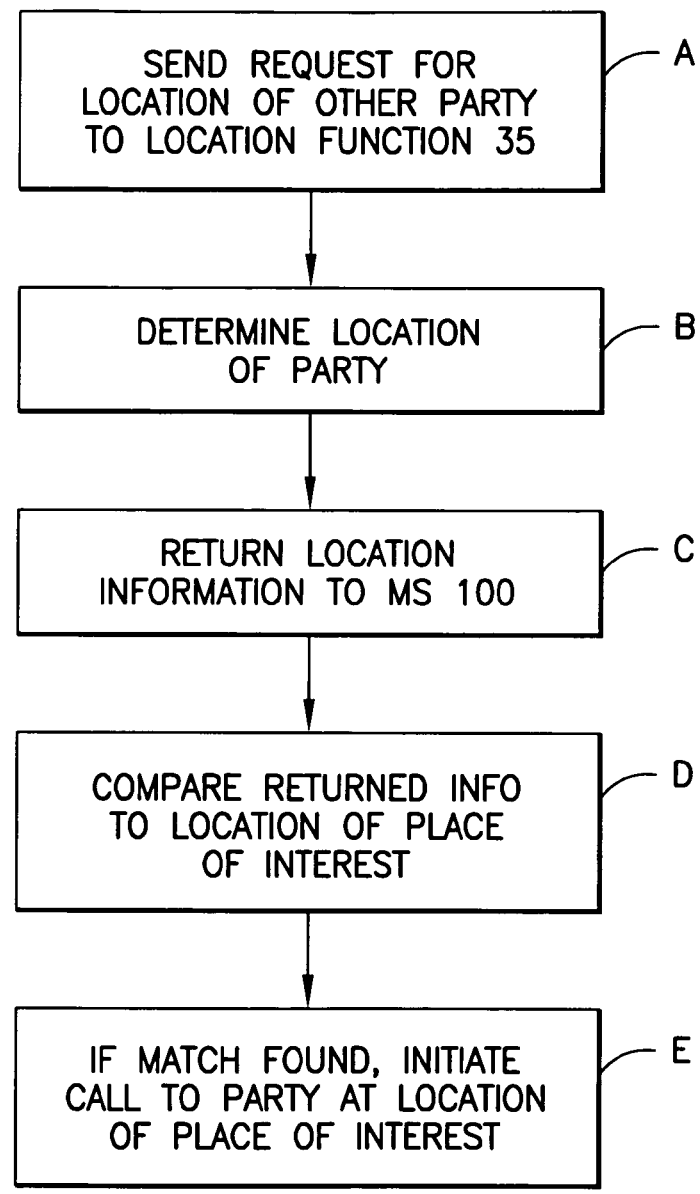
FIG. 2 is a logic flow diagram that is illustrative of a method in accordance with the exemplary embodiments of this invention.

The exemplary embodiments of this invention may be implemented by computer software (e.g., the CL application 103B) executable by a data processor of the mobile station 100, such as the processor 120, or by hardware, or by a combination of software and hardware. Further in this regard it should be noted that the various blocks of the logic flow diagram of, for example, FIG. 2 (described below) may represent program steps, or interconnected logic circuits, blocks and functions, or a combination of program steps and logic circuits, blocks and functions.

The memory 130 may be of any type suitable to the local technical environment and may be implemented using any suitable data storage technology, such as semiconductor-based memory devices, magnetic memory devices and systems, optical memory devices and systems, fixed memory and removable memory. The data processor(s) 120, 180 may be of any type suitable to the local technical environment, and may include one or more of general purpose computers, special purpose computers, microprocessors, digital signal processors (DSPs) and processors based on a multi-core processor architecture, as non-limiting examples.

The display 140 and user input 160 may be integrated into a touch sensitive display device, or they may be separate components. The user input may be any suitable input device or devices, such as a keypad, keyboard and/or pointing device, or a voice recognition unit to receive and interpret voice commands from a user, as a few non-limiting examples.

In accordance with the exemplary embodiments of this invention, instead of placing a call to a person, by the use of the contact list 130A the user calls a place. When the user is calling a place the CL application 130B of the MS 100, in cooperation with the network operator 20, such as a location function 35 of the network node 30, determines which (if any) communication devices are located at the place to be called. Contacts in the contact list 130A may be used for determining the devices for the certain location. When the CL application 130B has located a contact or contacts that are in the certain location, the MS 100 may initiate a call to a device at the location of the place to be called by the user. In a case where there are two or more contactable devices at the same desired location, the CL application 130B, via the display 140, may prompt the user to select a particular contact to call. Alternatively, the CL application 130B may automatically select one of the contacts, such as a based on prior history and/or in accordance with predetermined user preferences, and calls the device of the selected contact.

From the contact list 130A, and the underlying software of the CL application 130B, the user may also select to call to certain person, and may select that the call is only initiated if that person is at a certain location. The user may, for example, decide to call a friend only if the friend is located in the same city as the user. If user is not in the same city, then the call is not initiated and the user may be informed why via the display 140.

The contact list 130A may also be used to check where certain people are located. For example, the user may select a certain location (e.g., Boston) and then view on the display 140 which of the contacts are in the Boston area. Alternatively, the user can select one contact from the contact list 130A and then view the current location of the selected contact.

The current location of the MS 100 may be determined using any available location determining system. For example, the GPS module 170 can be used, as may network determined cell location information (although typically with less resolution than the GPS-determined location information). It is also within the scope of the exemplary embodiments of this invention for the user to manually input his or her current location via the user input 160, such as by entering the name of a city or other landmark (e.g., a University, a street address, a museum), or if known to enter location coordinates (e.g., latitude and longitude). As another example, a given user can determine his location and inform others via a presence application or other similar application that can send location-type of information to other devices. Note as well that if the MS 100 is capable of communication with a wireless local area network (WLAN), then the MS 100 may have knowledge of its current location from an identification of an access point (e.g., a WLAN hotspot access point) and by correlating the access point location with a predetermined location of the access point.

The location of a place of interest (e.g., the cottage referred to above) can be determined in a similar manner. For example, using the user input 160 and the display 140 the user may, when located at the cottage, initiate a location recording mode of operation of the CL application 130B where the user enters a descriptive text string (e.g., "cottage"), and then the current location (e.g., GPS coordinates, or cell location information) of the MS 100 is stored in association with the entered text string. Alternatively, if the user knows the location coordinates of the cottage he can enter them in conjunction with the descriptive text string. In this case the user need not be physically located at the cottage when the location of the cottage is entered and stored.

In all of these embodiments it is also within the scope of the exemplary embodiments of this invention to simply enter an address, via the user input 160, that is sent to the network 20 where the address is correlated with location coordinates. This may be accomplished by the use of an electronic mapping or similar function that is locally maintained or that is remotely maintained, such as by a server reachable through the Internet 70.

For those cases where cell location information is used then signaling between the network operator 20 and the MS 100 may be used to request and to provide the current location of the MS 100.

For those cases where the MS 100 needs information regarding the location of one or more other users, signaling between the network operator 20 and the MS 100 may be used to request and to provide the current location of one or more other users. As one non-limiting example, and referring to FIG. 2, at Block A the MS 100 sends a request to the network operator 20, such as to the location function 35 associated with the network node 30, for the current location of a particular user. This can be accomplished by sending the telephone number of the particular user, or any suitable identifying information that is known to, or that can be resolved by, the location function 35. At Block B the location function 35 determines, if possible, the current location of the particular user, such as by cell location or by querying the communication device of the other user for its current GPS location, and then at Block C returns the location information to the MS 100.

Note that in the example discussed above, i.e., when the user is attempting to contact someone at the cottage, that the MS 100 can request the location of one or more specific persons having contact information in the contact list 130A. At Block D the contact list application 130B compares the returned location information for the selected person or persons with the pre-stored location of the place of interest (e.g., the cottage), and when a match is found (to within some fixed or variable tolerance) the MS 100 may automatically place a call to the phone number associated with the matching location coordinates (Block E). Alternatively, the contact list application 130B may accumulate two or more matching other persons, and then display to the user a list of those persons who are currently at the cottage, thereby enabling the user to select which other person to call.

Figure 3:
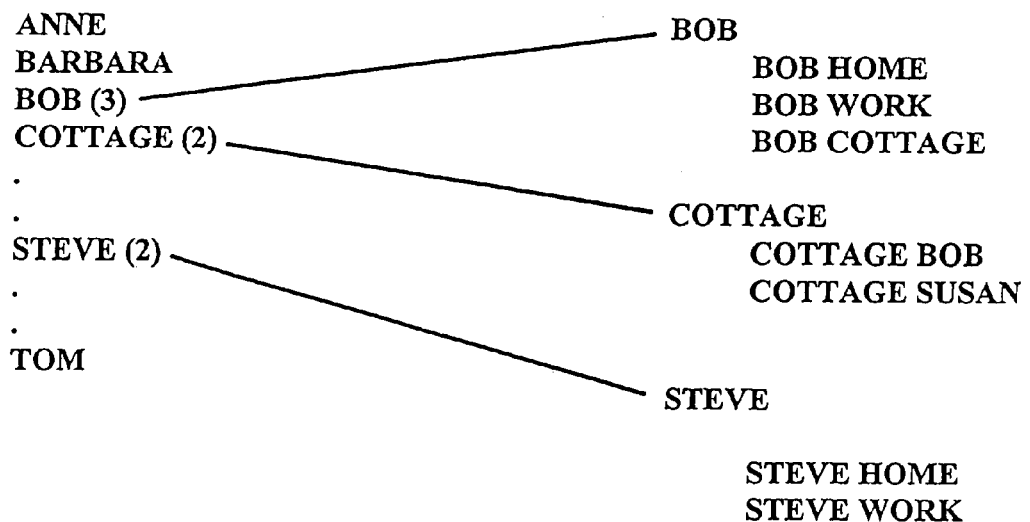
FIG. 3 shows a non-limiting example of a displayed contact list in accordance with the exemplary embodiments of this invention.

FIG. 3 shows a non-limiting example of the appearance of the contact list 130A on the display 140. The contact list 130A may include all normal contact list information, such as names and other information (such as a phone number of the person, an email address of the person, and so forth). In accordance with the exemplary embodiments of this invention, the contact list 130A also includes at least one location. In the example of FIG. 3, for certain contacts (e.g., Bob and Steve) the user has defined location information for certain places. For example, Bob's contact card includes three location definitions (home, work, cottage), while Steve's contact card has two locations defined (home, work). The user may, if desired, select to call Bob or Steve in a conventional manner, or to instead select to call Bob or Steve using a subcontact list under Bob and Steve, such as Bob at home. If selected, the call is placed to Bob only if the CL application 130B, in cooperation with the network location function 35, determines that Bob's phone is currently located at the coordinates that correspond to the previously entered "Bob Home" coordinates.

Note that the contact list 130A also includes a Cottage entry (a place). By selecting this entry the CL application 130B, in cooperation with the network location function 35, makes a determination if anyone in the contact list 130A is currently located at the cottage. In this example this determination has found that both Bob and Susan are currently located at the cottage, and the user may initiate a call to either or both of them. Alternatively, the MS 100 may select one of the two persons to call at the cottage, such as by selecting the first name in the list, or by selecting the party that was most recently called by the user, or by using a stored user preference (e.g., always call Bob before Susan), or by using any suitable criterion or criteria.

Further by example, the contact list 130A could include as a place the name of a city (e.g., Boston). Then by selecting this entry the CL application 130B, in cooperation with the network location function 35, would make a determination if one or more of the contacts in the contact list 130A is currently located in Boston and, if so, a call can be placed to this person. In this case the location of Boston may be defined by a range of GPS location coordinates and/or cell locations that cover some geographical area that encompasses the city of Boston (or some portion of Boston, such as the downtown area).

As such, it can be appreciated that the contact list 130A may include one or more pure locations or places (e.g., Boston, Cottage, Home), thereby enabling the user to place a call to the location without regard for who answers the call. In this case the call can be made so long as one phone belonging to some person, preferably some person listed in the contact list 130A, is found to be currently located at the place of interest.

It is within the scope of the exemplary embodiments of this invention for the CL application 130B to inform the user of where, for example, Bob is located before the user attempts to call Bob.

It is also within the scope of the exemplary embodiments of this invention to add a contact group under a certain location so that the user is enabled to call to certain group of people (group call) at the certain location.

It is also within the scope of the exemplary embodiments of this invention to use the location-based calling for message sending (a message call), as opposed to making a voice call. For example, only if a certain person is currently in a certain location is a message (e.g., a text message, a multi-media message) sent to that person. The location-based information may also be employed to determine if instant messaging or chat messaging is to be sent, and may be applied as well to the sending of meeting requests and email.

As one non-limiting example, assume a meeting is scheduled for 10:00 AM in Boston. In this case the exemplary embodiments of this invention maybe employed to send at 9:00 AM an invitation to the meeting only to those persons in the contact list that are determined to be currently located in Boston, and to not send the meeting invitation to those persons outside of the Boston area (it being assumed that they would not have sufficient time to arrive at the meeting by 10 AM). Note that in this case, as well as various ones of the other cases discussed herein, that certain persons may be located using GPS information, while others may located using network cell-based information, while still others may be located using manually entered location information.

Note further that it is within the scope of the exemplary embodiments of this invention to provide a map view capability for use with the contact list 130A, whereby the user can select an area on a displayed map for specifying a place where a given call or message will be directed, assuming that at least one other user is found to be located within the region selected by the user on the displayed map.

The exemplary embodiments of this invention are not restricted for use with mobile devices, and can also be used with VoIP, video and other forms of calls, including communications made through computers and other types of devices.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting embodiments a full and informative description of the invention. However, various modifications and adaptations may become apparent to those skilled in the relevant arts in view of the foregoing description, when read in conjunction with the accompanying drawings and the appended claims.

For example, while described above in at least one non-limiting example as the user selecting a location from the contact list 103A, it is within the scope of the invention for the user to simply enter the name of a location via the user interface of the MS 100 (e.g., Boston), to send the entered location name to the location function 35, to determine coordinates associated with the location name, and to then make a determination if one or more contacts in the user's contact list 130A is currently present within the coordinates associated with the location name. Note that the determination of the location coordinates can be done locally at the location function 35, or the location function 35 may make an inquiry to another unit, such as a server reachable through the Internet 70, to obtain the location coordinates. Further, it can be appreciated that at least some of the functionality of the CL application 130B may be resident at the network operator 20, such as in the location function 35. Further, a copy of some or all of the user's contact list 130A may be resident at the network operator 20, such as at the location function 35, to reduce the amount of signaling that is performed when making a location-based type of call in accordance with the exemplary embodiments of this invention.

However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
   in a first mode of operation, specifying a place via a user interface of a device that comprises communication functionality, where specifying comprises using a contact list that is stored in a memory of the device and that is displayed to a user of the device, where the place is presented to the user as a place name entry in the contact list;
   determining if another device that comprises communication functionality is currently located at the specified place; and
   placing a call to the other device if the other device is determined to be currently located at the specified place.

2. The method of claim 1, where determining uses GPS coordinates.

3. The method of claim 1, where determining uses cell location information.

4. The method of claim 1, further comprising:
   in a second mode of operation, specifying a name of person associated with another device;
   determining a location of the other device, and
   displaying the determined location using the user interface of the device.

5. The method of claim 1, further comprising an initial step of storing in the contact list a name of the place in association with information that is descriptive of a location of the place.

6. The method of claim 5, where storing stores coordinates obtained from a GPS system in association with the name of the place.

7. The method of claim 5, where storing stores cell location information in association with the name of the place.

8. The method of claim 5, where storing stores user-specified location information in association with the name of the place.

9. The method of claim 1, where the device comprises a wireless communications device.

10. The method of claim 1, where placing a call automatically places the call if the another device is one associated with another entry in the contact list.

11. The method of claim 1, where placing a call includes determining if more than one another device is currently located at the specified place and, if so, further comprises automatically selecting one of the another devices and placing the call to the selected one of the another devices.

12. The method of claim 1, where placing a call includes determining if more than one another device is currently located at the specified place and, if so, further comprises displaying to the user identifications of the more than one another devices, and in response to the user making a selection, placing the call to the selected one of the another devices.

13. A computer-readable memory that stores a computer program that comprises program instructions execution of which by at least one data processor results in operations comprising:
  in a first mode of operation, specifying a place via a user interface of a device that comprises communication functionality, where specifying comprises using a contact list that is stored in a memory of the device and that is displayed to a user of the device, where the place is presented to the user as a place name entry in the contact list;
  determining if another device that comprises communication functionality is currently located at the specified place; and
  placing a call to the other device if the other device is determined to be currently located at the specified place.

14. The memory of claim 13, where the determining operation uses GPS coordinates.

15. The memory of claim 13, where the determining operation uses cell location information.

16. The memory of claim 13, further comprising operations of:
  in a second mode of operation, specifying a name of person associated with another device;
  determining a location of the other device; and
  displaying the determined location using the user interface of the device.

17. The memory of claim 13, further comprising an initial operation of storing in the contact list a name of the place in association with information that is descriptive of a location of the place.

18. The memory of claim 17, where the storing operation stores coordinates obtained from a GPS system in association with the name of the place.

19. The memory of claim 17, where the storing operation stores cell location information in association with the name of the place.

20. The memory of claim 17, where the storing operation stores user-specified location information in association with the name of the place.

21. The memory of claim 13, where the device comprises a wireless communications device.

22. A device, comprising:
  an interface to a communications network;
  at least one data processor;
  at least one memory coupled to the at least one data processor, the at least one memory storing a contact list; and
  a user interface coupled to the at least one data processor; where
  the data processor is responsive to a user specifying a place, where the place is presented to a user as a place name entry in the contact list, to determine if another device associated with a person in the contact list is present at the specified place and, if so, to contact the other device via the interface to the communications network.

23. The device of claim 22, where the interface to the communications network is comprised of a wireless interface.

24. The device of claim 22, where the interface to the communications network is comprised of a wired interface.

25. The device of claim 22, where the data processor uses GPS coordinates, received through the interface, to determine if another device associated with a person in the contact list is at the specified place.

26. The device of claim 22, where the data processor uses information based on cell location information, received through the interface, to determine if another device associated with a person in the contact list is at the specified place.

27. The device of claim 22, where the data processor is further operable, in response to the user specifying a person associated with another device, to display on the user interface a location of a device associated with specified person.

28. The device of claim 22, where said contact list stores a name of the place in association with information that is descriptive of a location of the place.

29. The device of claim 28, where the information that is descriptive of a location of the place is obtained from a GPS system.

30. The device of claim 28, where the information that is descriptive of a location of the place is obtained from cell location information.

31. The device of claim 28, where the information that is descriptive of a location of the place is obtained from the user of the device via the user interface.

* * * * *